C. MACKINTOSH.
FAUCET FILTER.
APPLICATION FILED DEC. 22, 1908.

915,616.

Patented Mar. 16, 1909.

WITNESSES;

INVENTOR
CHARLES MACKINTOSH
BY Geo. H. Strong.
HIS ATTORNEY.

UNITED STATES PATENT OFFICE.

CHARLES MACKINTOSH, OF OAKLAND, CALIFORNIA.

FAUCET-FILTER.

No. 915,616.　　　　Specification of Letters Patent.　　Patented March 16, 1909.

Application filed December 22, 1908. Serial No. 468,728.

*To all whom it may concern:*

Be it known that I, CHARLES MACKINTOSH, a citizen of the United States, residing at Oakland, in the county of Alameda and State of California, have invented new and useful Improvements in Faucet - Filters, of which the following is a specification.

My invention relates to a filtering attachment for faucets.

It consists of the parts and the construction and combination of parts as hereinafter more fully described and claimed, having reference to the accompanying drawings, in which—

Figure 1:
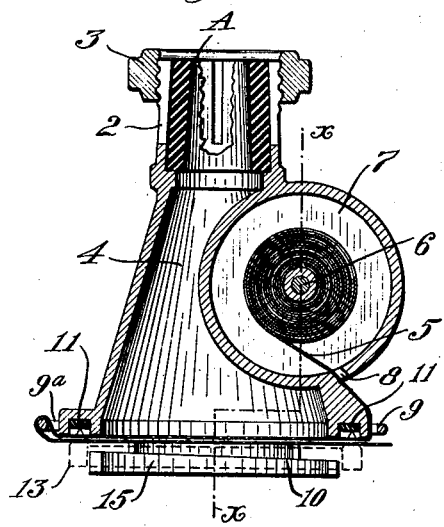
Figure 2:
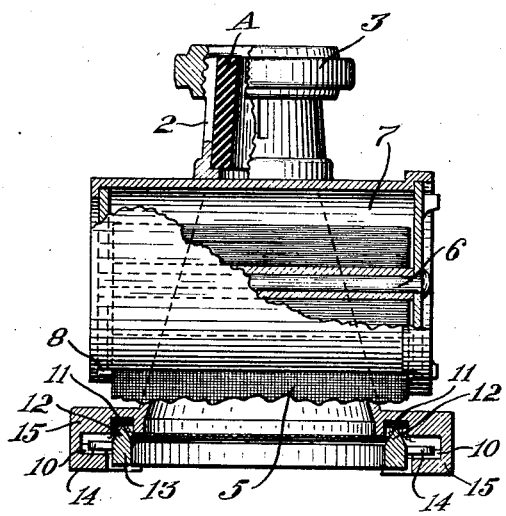
Figure 3:
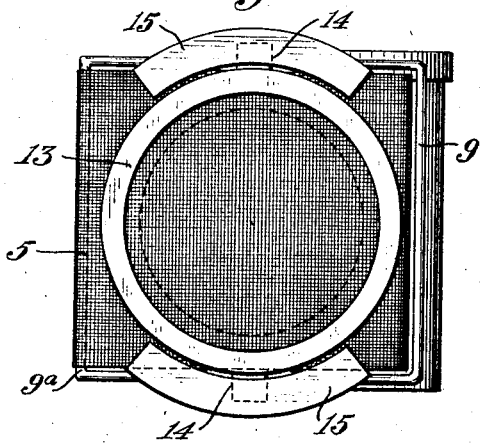

Figure 1 is a vertical section. Fig. 2 is a vertical section on the line *x—x* Fig. 1. Fig. 3 is an inverted plan view.

The object of my invention is to provide a structure adapted to be attached to a faucet, said structure having a discharge passage and chamber, and a cylindrical chamber adapted to contain a coil of filtering material, with means for uncoiling and stretching said material across the discharge passage to arrest sediment carried by the water.

As shown in the drawings, A is a rubber sleeve which is adapted to fit and form a joint around the faucet, and this is contained within a split or sectional tube 2 having the upper end screw-threaded. Around this is fitted a screw-threaded ring 3, and as the device is slightly tapered, the screwing down of this ring compresses the split sleeve, and thus clamps the structure carried thereby firmly upon the end of the faucet.

Below the ring a divergent or cone-shaped chamber 4 is formed, having an open discharge at the lower end of larger diameter than the inlet at the top. At one side of this chamber is a closed chamber or drum 7 which may have a horizontal axis and shaft at 6. Within this is coiled the filter which may be of any suitable material for the purpose. Such a filter is shown at 5. A coil of this material may be placed within the drum. The coil may be fitted into the interior of the drum by removing one of the heads of the drum, or in other suitable or convenient manner. The end of the filtering material is then carried out through an open slot 8 in the periphery of the drum, thence over a rounded edge, and through a guiding slot as shown at 9, and thence it passes across the discharge mouth of the cone-shaped passage 4, and over another edge, and through another slot 9ª, thence it is returned beneath the first thickness across the discharge passage so that there will be two thicknesses of the filtering material covering the mouth of the discharge passage.

The filtering material is kept in place by means of a clamping ring 13, having oppositely disposed lugs 14, adapted to slide in the slotted shoulders 15, and on the beveled inclines as at 10, and thereby lock against the bottom of the discharge mouth to hold the filter in position.

11 is a packing ring of rubber or other material located in a channel in the bottom of the discharge passage 4, and the clamping ring 13 which screws upon it may have a V-shaped edge, as shown at 12, which forms a tight joint therewith.

The parts being assembled, water, when turned on, will pass through a double filter before being discharged.

Whenever the filter becomes foul by accumulation of sediment, it is only necessary to disengage the locking cap at the bottom, and by unwinding a portion of the filtering material a sufficient length of it is passed through the slots 9 to present new filtering surfaces, covering the outlet, the remainder being torn off, and the cap may again be secured, and will stretch the filtering material tight when thus secured.

By diverging the discharge passage from the inlet to the outlet, there is a much larger area at the mouth over which the filtering material is clamped; thus the body of water entering the chamber is spread out, and passes through the larger area of filtering material, so that the flow will not be as rapid, and the greater area facilitates the separation of sediment and the like.

Having thus described my invention, what I claim and desire to secure by Letters Patent is—

1. The combination in a filter of the character described, of a faucet discharge passage, means by which it may be secured to the faucet end, a horizontal cylindrical chamber formed at one side of said passage adapted to contain a roll of filtering material, guide slots through which the material may be drawn from the roll and extended across the discharge passage, and means for clamping the filtering material in place.

2. In an apparatus of the character described, a sleeve and clamp adapted to fit a faucet end, a divergent conical open mouthed discharge extension therefrom, a cylindrical case at one side of said discharge having a horizontally disposed chamber adapted to carry a coil of filtering material, slots upon each side of the discharge opening through which the filtering strip is carried, and means for locking said strip in position across said mouth.

3. In an apparatus of the character described, a faucet discharge having a horizontal casing formed at one side thereof, and a joint-forming clamp to secure the device to the faucet, a chamber extending through the case adapted to carry a coil of filtering material, slots through which said material is carried from the case across the discharge mouth, and thence returned to form a double thickness of filtering material, and a locking cap by which the filter is secured in position.

4. In a filter of the character described, a downwardly divergent discharge passage, a horizontal circular casing formed at one side thereof, a chamber in said casing adapted to carry a roll of filtering material, guide slots through which the material is drawn from the casing, carried across the discharge mouth and thence returned upon itself, a compressible gasket surrounding the discharge mouth, and a locking clamp adapted to form a joint with said gasket, and to stretch and lock the filtering material in position.

In testimony whereof I have hereunto set my hand in presence of two subscribing witnesses.

CHARLES MACKINTOSH.

Witnesses:
CHARLES EDELMAN.
C. C. COOK.